United States Patent
Chen (10) Patent No.: US 8,717,370 B2
(45) Date of Patent: May 6, 2014

(54) METHOD AND SYSTEM FOR AUTOMATICALLY ANALYZING GPU TEST RESULTS

(75) Inventor: James Chen, Shenzhen (CN)

(73) Assignee: Nvidia Corporation, Santa Clara, CA (US)

( * ) Notice: Subject to any disclaimer, the term of this patent is extended or adjusted under 35 U.S.C. 154(b) by 1057 days.

(21) Appl. No.: 11/948,984

(22) Filed: Nov. 30, 2007

(65) Prior Publication Data

US 2009/0128570 A1 May 21, 2009

(51) Int. Cl.
*G06F 15/16* (2006.01)

(52) U.S. Cl.
USPC ............ 345/502; 345/426; 345/501; 345/505; 345/506; 345/582

(58) Field of Classification Search
USPC .......... 345/426, 501, 502, 505, 506, 522, 582; 324/360; 712/228; 717/159; 711/159; 714/26, 723, 724
See application file for complete search history.

(56) References Cited

U.S. PATENT DOCUMENTS

| | | | | |
|---|---|---|---|---|
| 5,588,115 A * | 12/1996 | Augarten | ........................ | 714/29 |
| 5,631,868 A * | 5/1997 | Termullo et al. | ............... | 365/200 |
| 5,720,031 A * | 2/1998 | Lindsay | ........................... | 714/42 |
| 6,064,948 A * | 5/2000 | West et al. | ..................... | 702/119 |
| 6,301,163 B1 * | 10/2001 | Hidaka et al. | ................. | 365/200 |
| 6,330,693 B1 * | 12/2001 | Lindsay | ........................... | 714/42 |
| 6,357,027 B1 * | 3/2002 | Frankowsky | ................. | 714/738 |
| 6,484,275 B1 * | 11/2002 | Josephson et al. | .............. | 714/39 |
| 6,842,866 B2 * | 1/2005 | Song et al. | ........................ | 714/37 |
| 7,065,605 B2 * | 6/2006 | Yeow et al. | ........................ | 711/4 |
| 2003/0145280 A1 * | 7/2003 | Grey et al. | ......................... | 715/513 |
| 2005/0159925 A1 * | 7/2005 | Gedamu | ........................ | 702/186 |
| 2005/0188218 A1 * | 8/2005 | Walmsley et al. | ............. | 713/200 |
| 2005/0213761 A1 * | 9/2005 | Walmsley et al. | ............. | 380/255 |
| 2005/0240850 A1 * | 10/2005 | Ohwada et al. | ................ | 714/738 |
| 2005/0262492 A1 * | 11/2005 | Goetting et al. | ............... | 717/151 |
| 2006/0056728 A1 * | 3/2006 | Silverbrook et al. | .......... | 382/276 |
| 2006/0064268 A1 * | 3/2006 | Dorough et al. | .............. | 702/117 |
| 2006/0117274 A1 * | 6/2006 | Tseng et al. | ....................... | 716/1 |
| 2006/0197847 A1 * | 9/2006 | Johnson et al. | ............ | 348/229.1 |
| 2006/0231627 A1 * | 10/2006 | Silverbrook et al. | .......... | 235/454 |
| 2006/0290365 A1 * | 12/2006 | Riedlinger et al. | ............ | 324/760 |
| 2007/0140024 A1 * | 6/2007 | Perry et al. | ..................... | 365/201 |
| 2007/0202918 A1 * | 8/2007 | Shin et al. | .................... | 455/562.1 |
| 2007/0220342 A1 * | 9/2007 | Vieira et al. | ...................... | 714/33 |
| 2009/0083325 A1 * | 3/2009 | Belide et al. | ................. | 707/104.1 |
| 2010/0058114 A1 * | 3/2010 | Perkins et al. | .................. | 714/39 |
| 2010/0088054 A1 * | 4/2010 | Miguelanez et al. | ........... | 702/81 |

* cited by examiner

*Primary Examiner* — James A. Thompson
*Assistant Examiner* — Abderrahim Merouan
(74) *Attorney, Agent, or Firm* — Patterson + Sheridan, L.L.P.

(57) ABSTRACT

A method and system for automatically analyzing graphics processing unit ("GPU") test results are disclosed. Specifically, one embodiment of the present invention sets forth a method, which includes the steps of identifying the GPU test results associated with a first register type, creating a template document associated with the same first register type, wherein the template document is pre-configured to store and operate on the GPU test results of the first register type, filling the GPU test results in the template document, aggregating the GPU test results associated with the first register type to establish a common output, and determining a suitable register value from a passing range of register values based on the common output without human intervention.

17 Claims, 8 Drawing Sheets

|   | bit1 | bit2 | bit3 | bit4 | bit5 | bit6 | bit7 | bit8 |
|---|------|------|------|------|------|------|------|------|
| 7 | 1 | 2 | 3 | 4 | 0 | 0 | 0 | 0 |
| 6 | 3 | 2 | 1 | 0 | 0 | 0 | 0 | 0 |
| 5 | 5 | 4 | 0 | 0 | 0 | 0 | 0 | 0 |
| 4 | 4 | 0 | 0 | 0 | 0 | 0 | 0 | 0 |
| 3 | 0 | 0 | 0 | 0 | 0 | 0 | 0 | 0 |
| 2 | 0 | 0 | 0 | 0 | 0 | 0 | 0 | 0 |
| 1 | 0 | 0 | 0 | 0 | 0 | 0 | 0 | 0 |
| 0 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 1 | 2 | 3 | 4 | 0 | 0 | 0 | 0 |
| 14 | 3 | 2 | 1 | 0 | 0 | 0 | 0 | 0 |
| 15 | 5 | 4 | 0 | 0 | 0 | 0 | 0 | 0 |

702

704

Register Values

Passing Range

Pass/fail Information

METHOD AND SYSTEM FOR AUTOMATICALLY ANALYZING GPU TEST RESULTS

CROSS-REFERENCE TO RELATED APPLICATIONS

This application claims priority to co-pending Chinese patent application Serial No. 200710165578.2, filed Nov. 19, 2007. Abovementioned related patent application is herein incorporated by reference.

BACKGROUND OF THE INVENTION

1. Field of the Invention

The present invention relates to graphics processing unit ("GPU") testing techniques, and more particularly, to a method and system for automatically analyzing GPU test results.

2. Description of the Related Art

Unless otherwise indicated herein, the approaches described in this section are not prior art to the claims in this application and are not admitted to be prior art by inclusion in this section.

A GPU is a dedicated graphics rendering device with a highly parallel architecture capable of performing complex algorithms. Before mass producing such a complicated device or a product containing the device (e.g., a graphics adapter), extensive testing is needed to ensure the proper functioning of the GPU design and also to determine a set of optimal parameters for the GPU. In particular, a GPU includes a set of registers configured to control the communication interface between the GPU and graphics memory. The values stored in these registers directly affect certain hardware configurations in the GPU, which cause the data signals associated with the communication to change. Thus, one test is to determine a set of values to configure the registers with, so that the data signals associated with the communication meet the specifications of the graphics memory.

Figure 1:
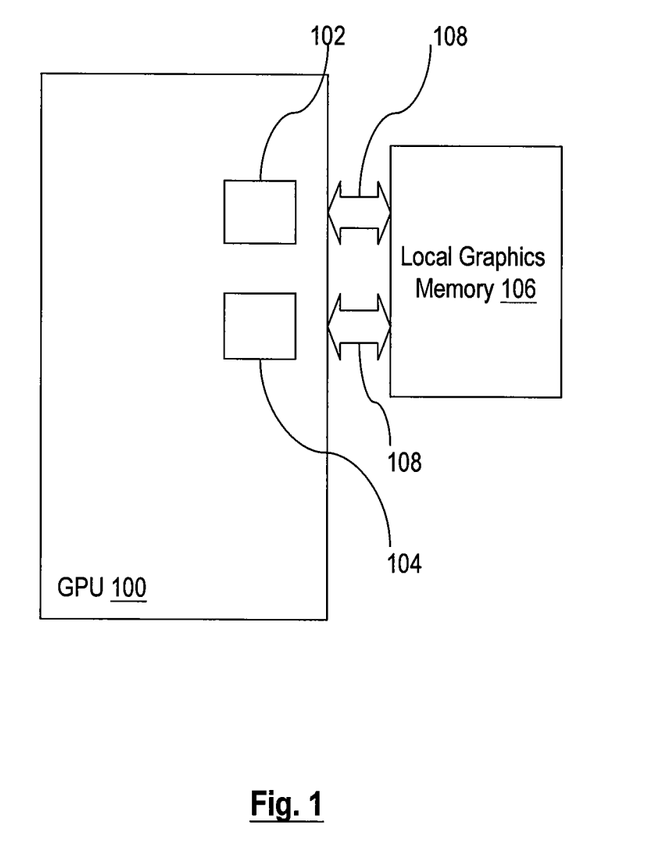
FIG. 1 is a schematic diagram illustrating a GPU communicating with a local graphics memory through a local bus.

To illustrate, FIG. 1 is a schematic diagram illustrating a GPU 100 communicating with a local graphics memory 106 through a local bus 108. The GPU 100 includes registers 102 and 104, which control the hardware configuration in the GPU to change the interface between the GPU and the local graphics memory 106. One way to verify whether the GPU registers 102 and 104 contain the valid values for the GPU 100 to communicate with the local graphics memory 106 is by checking whether the data written to a certain memory location in the local graphics memory 106 can be properly retrieved. Specifically, by configuring the registers 102 and 104 with different values, the test then compares the data written to and retrieved from the local graphics memory 106 during the communication between the GPU 100 and the local graphics memory 106. If the data sent to and received from the local graphics memory 106 are inconsistent, or if no data is retrieved from the local graphics memory 106, then the test fails, and the register values used in the failure scenario are considered invalid. On the other hand, if the data sent to and received from the local graphics memory 106 are the same, then the test passes, and the register values used in the passing scenario are considered valid.

Figure 2:
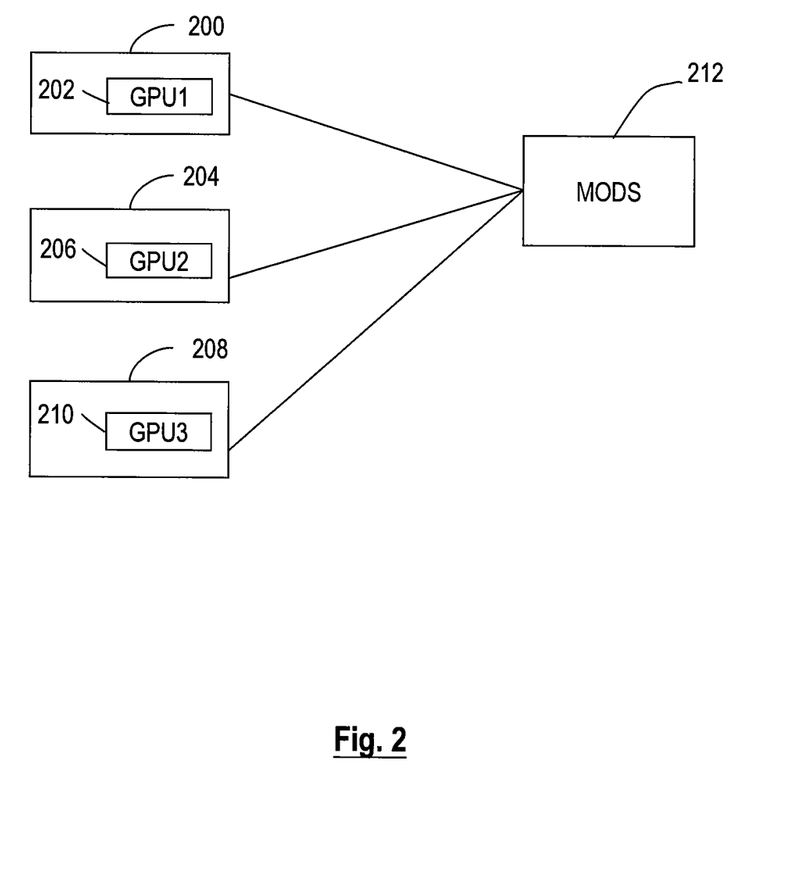
FIG. 2 is a simplified block diagram illustrating the configuration of an evaluation setup for testing multiple GPUs.

FIG. 2 is a simplified block diagram illustrating the configuration of an evaluation setup for testing multiple GPUs. GPUs 202, 206, and 210 are placed on testing graphics adapters 200, 204, and 208, respectively. The testing graphics adapters are further connected to a computer 212, in which a diagnostic tool, Modular Diagnostic Software (MODS), is executed on. The evaluation setup is typically for the same version and the same type of the GPU and the graphics adapter. MODS generally configures a register in each of the GPUs with different register values, performs the data comparison discussed above, and generates one corresponding log file containing "pass" and "fail" information. Conventionally, to establish which register values are considered valid, a human operator needs to locate the log file on the computer 212, open it, fill all the log files into certain spreadsheet templates which are manually created in advance, and inspect the information in the spreadsheets to make the determination. As the testing conditions become more and more complicated (e.g., increasing number of register values to verify and various versions or types of the GPU and graphics adapters to test), MODS also generates more and more log files. As a result, the human operator is required to inspect and manipulate information from an increasing number of log files. Such a labor-intensive process is not only burdensome and inefficient, but is also error-prone.

What is needed in the art is thus a method and system that can cost effectively and automatically analyze testing results without placing undue burden on a human operator and address at least the problems set forth above.

SUMMARY OF THE INVENTION

A method and system for automatically analyzing graphics processing unit ("GPU") test results are disclosed. Specifically, one embodiment of the present invention sets forth a method, which includes the steps of identifying the GPU test results associated with a first register type, creating a template document associated with the same first register type, wherein the template document is pre-configured to store and operate on the GPU test results of the first register type, filling the GPU test results in the template document, aggregating the GPU test results associated with the first register type to establish a common output, and determining a suitable register value from a passing range of register values based on the common output without human intervention.

At least one advantage of the present invention disclosed herein is to eliminate the need for a human operator to manipulate and analyze potentially massive amount of test results and thus significantly improves the robustness of the testing process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A GPU utilizes a variety of types of registers to control the transmission interface with memory subsystems, and one register type may be associated with a different tuning sequence and/or a different register size than the other register type. As mentioned above, the results associated with testing a particular register type are stored in log files. To illustrate, suppose there are two register types, type A and type B. Referring back the evaluation setup shown in FIG. 2, 3 log files are generated to capture the results of testing the type A register in the GPU 202, GPU 206, and GPU 210 communicating with the local graphics memory in the graphics adapters 200, 204, and 208, respectively. These three log files are labeled in the same way (e.g., include the same type A register name). If the same evaluation setup shown in FIG. 2 is to instead test type B register, then another three log files are generated and distinctly labeled (e.g., include the same type B register name).

Figure 3:
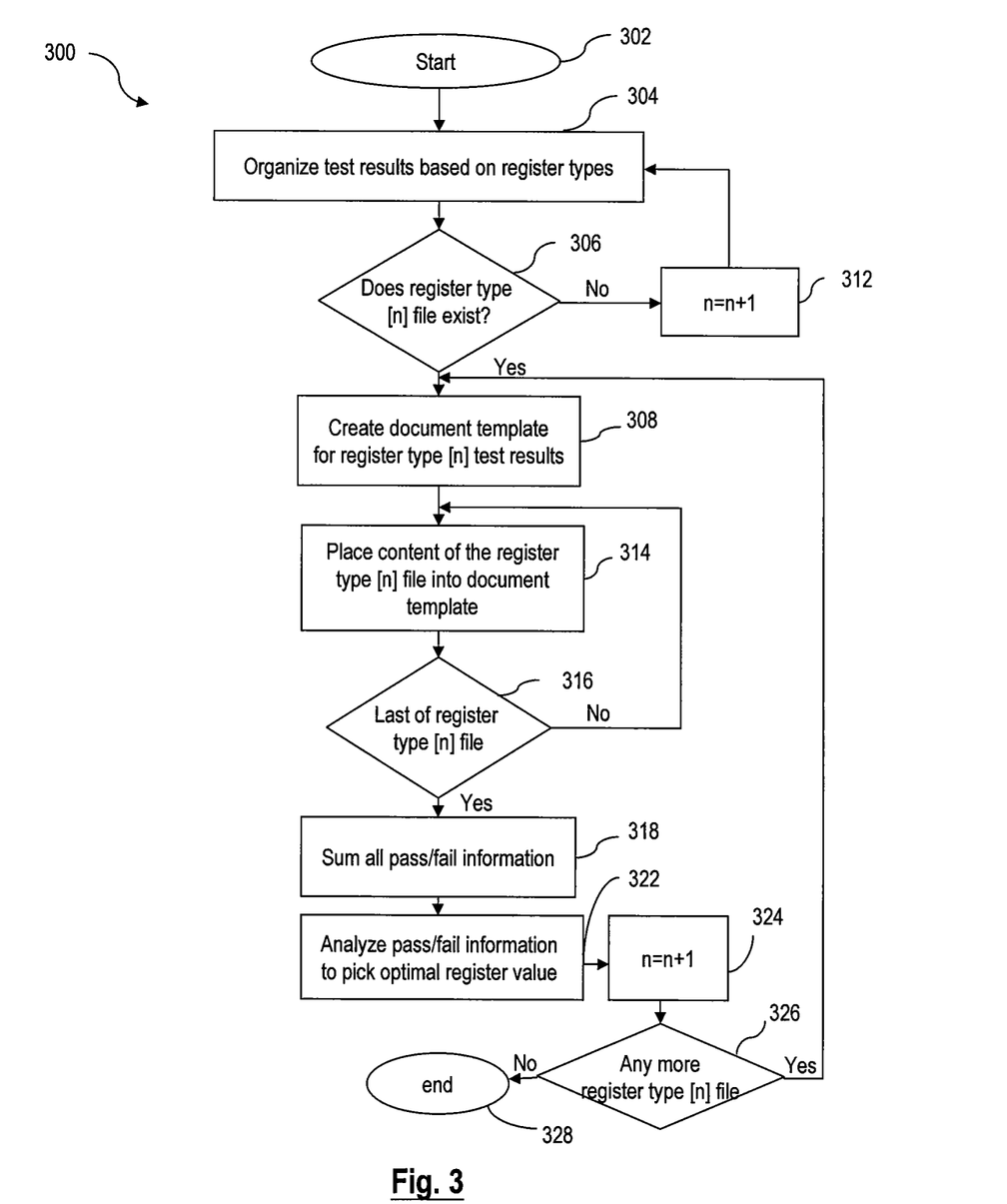
FIG. 3 is a flow chart illustrating a process for automatically analyzing GPU test results, according to one embodiment of the present invention.

FIG. 3 is a flow chart illustrating a process 300 for automatically analyzing GPU test results, according to one embodiment of the present invention. After the process 300 starts in step 302, it organizes the test results (e.g., pass/fail information) based on information relating to the register types (e.g., the register names written in the log files) in step 304. Subsequent paragraphs will further detail some organization approaches. Then, for each register type log file identified in step 306, the process 300 creates a document template (e.g., a pre-configured spreadsheet file) in step 308 to store the log file(s). After the creation, the content of the log file for that register type is placed into the document template in step 314, and step 314 is repeated until all the log files for the same register type are stored in the same document template. For example, if there are five log files for the type A register, then in one implementation, all five log files are stored as five separate spreadsheets in the same document template. In step 318, all the pass/fail information (e.g., zero indicating pass and non-zero values indicating fail) in the various spreadsheets is summed. Based on the summed results, the process 300 proceeds to determine which register value(s) for the specific register type is optimal to communicate between the GPU and graphics memory in step 322. Thereafter, the process 300 looks for other group of log files relating to another register type to place in a document template and sum and analyze the results.

Figure 4:
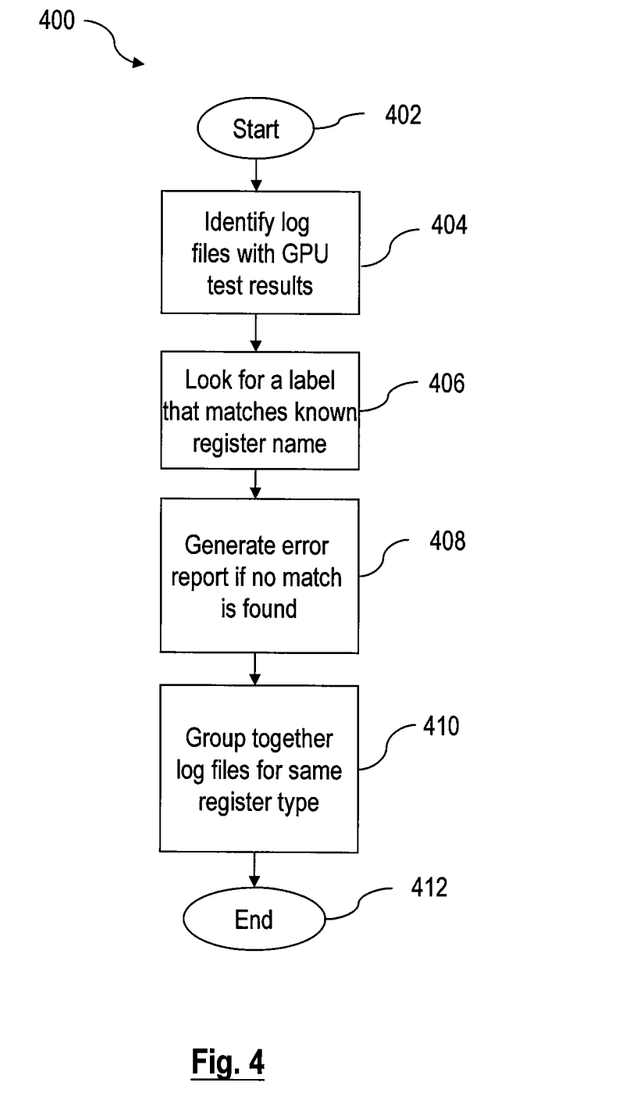
FIG. 4 is a flow chart illustrating a process for organizing GPU test results based on register types, according to one embodiment of the present invention.

FIG. 4 is a flow chart illustrating a process 400 for organizing GPU test results based on register types, according to one embodiment of the present invention. After starting the process in step 402, in one implementation, the process 400 identifies all the log files containing the GPU test results in step 404 by searching for log files with a specific label (e.g., a register name). After locating the log files, the process 400 looks to see if the label matches any of the known register names in step 406. For all the log files having the same label matching a known register name (e.g., DELTADRVDAT, which corresponds to a data drive fall register), the process 400 groups them together in step 410. In one implementation, the names of these log files are grouped together according to the matching register name. Alternatively, these log files are stored in a same folder or sub-folder. For any log file having a keyword that fails to match any of the known register names, the process 400 generates an error report in step 408. It should be apparent to a person with ordinary skills in the art to embed other information relating to a specific register type than the register name in the log files without exceeding the scope of the present invention.

Figure 5:
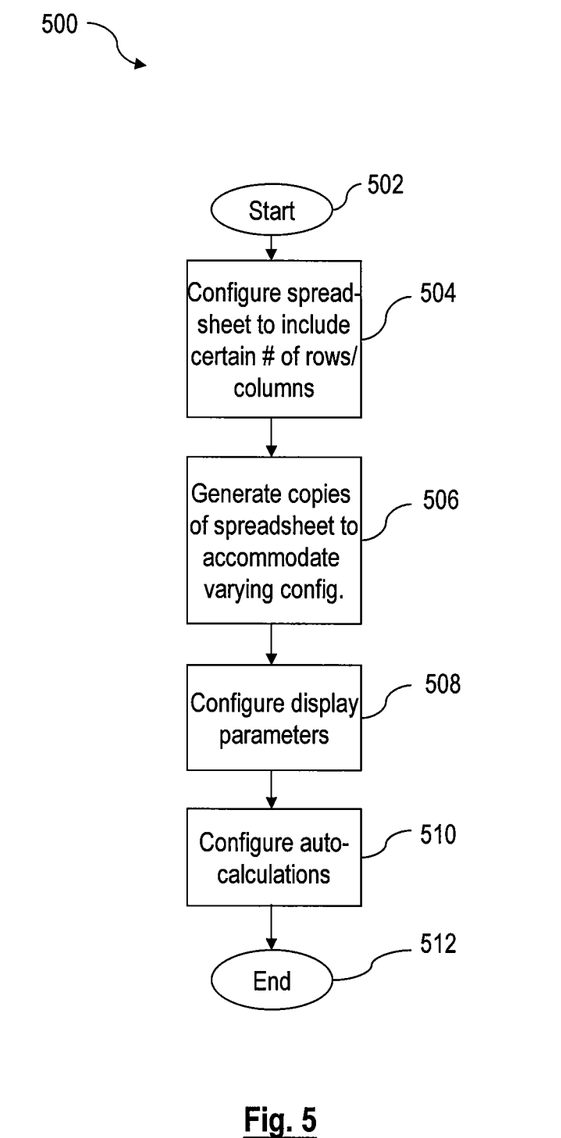
FIG. 5 is a flow chart illustrating a process for creating a document template tailored to a log file for a specific register type, according to one embodiment of the present invention.

FIG. 5 is a flow chart illustrating a process 500 for creating a document template tailored to a log file for a specific register type, according to one embodiment of the present invention. In step 504, a spreadsheet in the document template is configured to include a certain number of rows and columns for a given register type log file. Suppose the log file is for a type A register. In one implementation, each row in the spreadsheet is designed to capture the test results corresponding to a particular register value for this type A register, and each column in the spreadsheet is designed to store test results corresponding to a bit on the bus between the GPU and the local graphics memory on the graphics adapter. In step 506, additional copies of the spreadsheet are generated to accommodate the varying testing configurations. Using the type A register as an illustration, a copy of the spreadsheet is generated for (a) storing the results associated with testing a GPU containing the type A register placed on a version of the graphics adapter; or (b) storing the results associated with testing each of the type A registers. In other words, if this GPU has three type A registers and is placed on five different versions of the graphics adapter for testing, then fifteen copies of the spreadsheet are generated. Alternatively, five copies of the spreadsheet are generated, and each of the five copies is configured to store the test results for all three type A registers. These multiple copies of the spreadsheet are maintained in the same document template. The display of these spreadsheets is configured in step 508, so that the test results associated with a particular register type or a particular register of the register type, after they are filled into the spreadsheets, can be easily identifiable. In one implementation, different coloring schemes for different register types are utilized in each of the spreadsheets; alternatively, the cell dimensions in the spreadsheets are configured to handle the anticipated sizes of the test results, which are to be stored in the document template. In an optional step 510, each spreadsheet is configured with one or more formulae, so that the analysis of the test results, after they are stored in the multiple spreadsheets in the template document, can be carried out according to the formulae in this step without any intervention of a human operator. Alternatively, rather than embedding the aforementioned intelligence in each of the spreadsheets, the intelligence can be implemented either in the main spreadsheet program or a separate software program.

Figure 6:
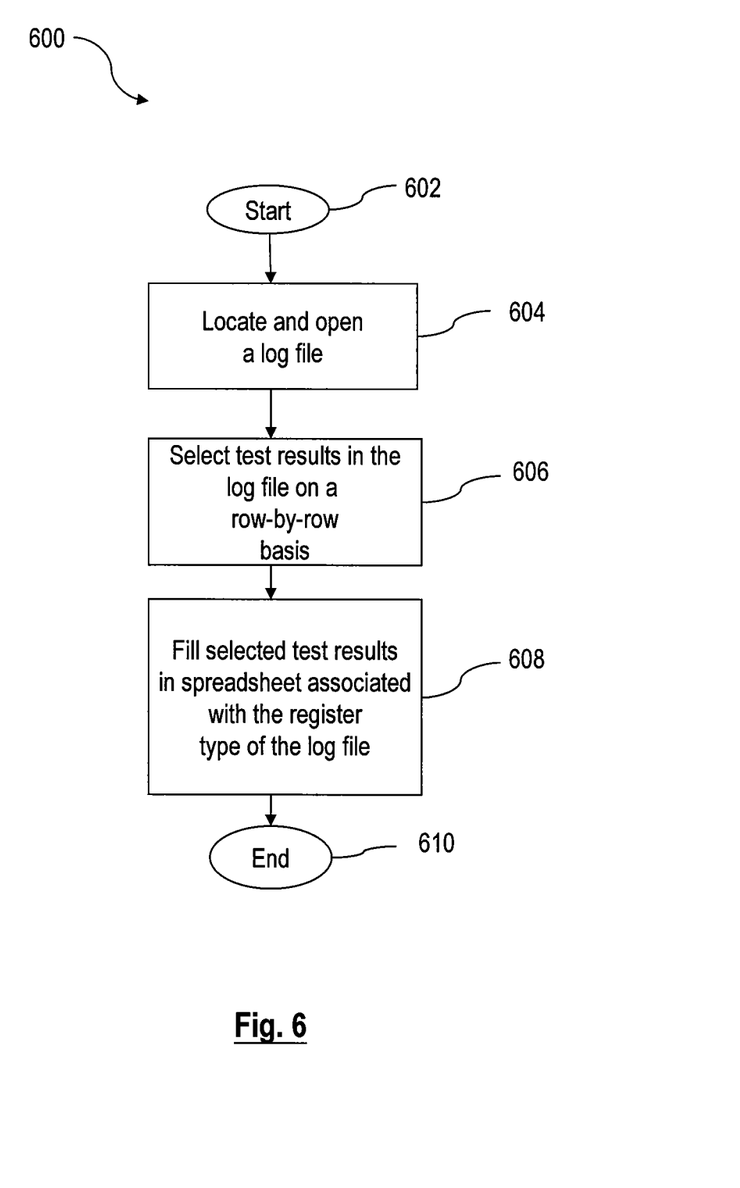
FIG. 6 is a flow chart illustrating a process for automatically placing the GPU test results into the template document, according to one embodiment of the present invention.

With the configured spreadsheets in the template document, FIG. 6 is a flow chart illustrating a process 600 for automatically placing the GPU test results into the template document, according to one embodiment of the present invention. As discussed above, the GPU test results are organized and even grouped together according to a specific register type. So, for each register type, the process 600 locates and opens a log file associated with the register type in step 604 to search for the test results (e.g., pass/fail information). If the first row in the log file does not include the pass/fail information, then the process 600 proceeds to inspect the second row of the log file. If the second row includes the pass/fail information, then the process 600 compares the register values written in the first column of the log file with the register values that have been written to the template document. If the comparison result indicates that they are the same, then the entire second row is selected in step 606 and is filled into the first row of the customized spreadsheet for the same type of register in step 608. Otherwise, the process 600 proceeds to the next row of the template document. The process 600 repeats this select-and-fill routine to fill the remaining rows of the log file that include the pass/fail information into the corresponding spreadsheet. After all the rows of one log file have been written to the spreadsheet, this log file is closed, and a second log file in the same group is opened. By using the same process discussed above, the test results in this second log file are again filled in the next spreadsheet. After all the log flies in the group have been processed, in one implementation, all the pass/fail information stored in all the spreadsheets is aggregated for further analysis. The aggregated results reflect all the failures during the register tuning process.

Figure 7:
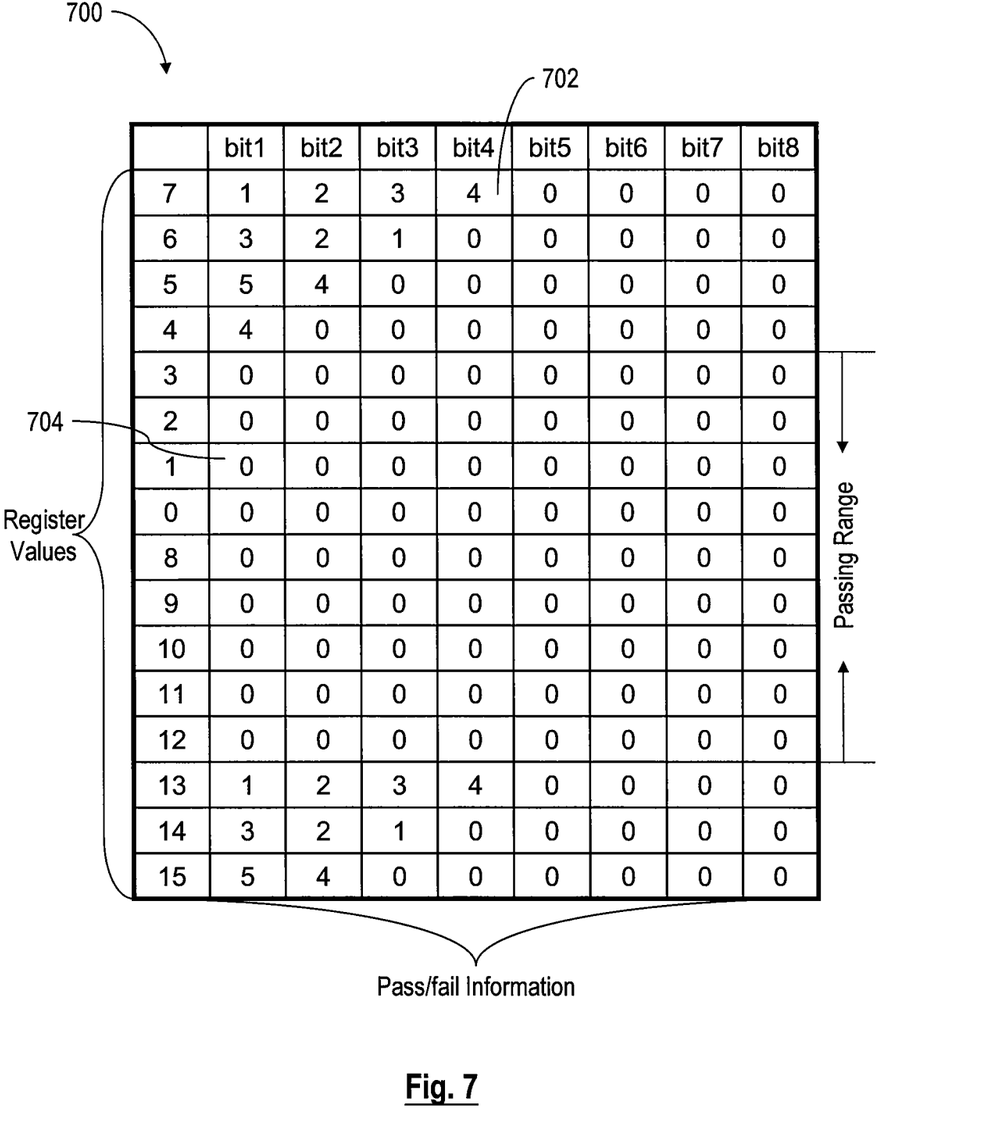
FIG. 7 is a portion of a sample spreadsheet generated according to one embodiment of the present invention.

After having test results placed into corresponding spreadsheets, all the pass/fail information is summed together to show how many times each tested register value for a particular register fails. FIG. 7 is a portion of a sample spreadsheet 700 generated according to one embodiment of the present invention. Each column of this sample spreadsheet, denoted with "bitn," represents the testing result associated with a data bit of the bus between a GPU and graphics memory. Each row, on the other hand, represents a possible register value and the testing result associated with such a register value. For illustration purposes, suppose the register to be tested is a 4-bit register (thus sixteen possible register values), and the bus between the GPU and the graphics memory is an 8-bit bus (also referred to as a "byte lane"). Here, one test is to configure the register with one of the 16 possible values and compare the test data that are sent through and received from the 8-bit bus. Then, the process is repeated for all 16 possible register values. For any register value, if any bit of the test data traveling on the 8-bit bus fails the test (e.g., the test data bit sent out fails to match the test data bit received), then the data bit is assigned a "1." Otherwise, the data bit is assigned a "0" indicative of passing the test. This pass/fail information associated with all 16 register values is stored in one customized spreadsheet as discussed above. This test is likely repeated multiple times, with the pass/fail information being stored in multiple copies of the same spreadsheet. So, if the same register value is associated with the same data bit failing the test, another "1" in the same location of another copy of the same spreadsheet is assigned. After all the pass/fail information captured in these spreadsheets is summed together, the summed results not only indicate the occurrences of test failures but also capture some details of such test failures (e.g., the number of times the failure occurs, which data bit fails, and the register value associated with each failure).

To further illustrate, a cell 702 in the sample spreadsheet 700 includes a numerical value 4, which indicates that the data bit 4 has failed 4 times when the tested register is configured with 7. On the other hand, a cell 704 includes a numerical value 0, which indicates that the data bit 1 has not failed when the tested register is configured with 1. Although in this implementation, any non-zero value captured in the spreadsheet indicates a test failure, the non-zero value does not always correspond to the number of times the failure occurs. For instance, one type of test failure is the lack of any returned test data from the graphics memory, and another type of test failure is the return of a nonsensical number.

Figure 8:
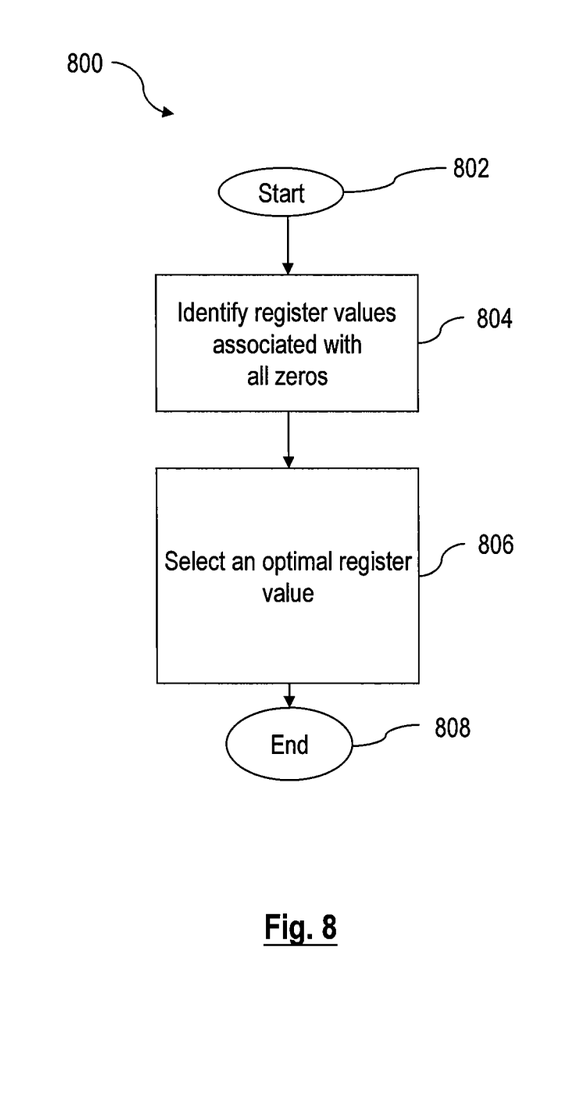
FIG. 8 is a flow chart illustrating a process for automatically identifying an optimal register value, according to one embodiment of the present invention.

FIG. 8 is a flow chart illustrating a process 800 for automatically identifying an optimal register value, according to one embodiment of the present invention. The process 800 looks through the summed pass/failed information to search for a range of register values that are associated with zeros for all the byte lanes in step 804. Suppose the sample spreadsheet of FIG. 7 represents a set of the summed pass/fail information. Then, the passing range of such register values includes the register values 12, 11, 10, 9, 8, 0, 1, 2, and 3. In one implementation, to pick the optimal register value in step 806 is to identify a register value that is close to the middle of the range. Referring again back to FIG. 7, the middle of the passing range is the register value 8. Choosing the middle of the passing range should widen the margin for errors, and such a register value is more likely to be suitable for different configurations.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive, CD-RW disks, DVD-RW disks, flash memory, hard-disk drive, or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

I claim:

1. A computer-implemented method for automatically analyzing test results related to the operability of a plurality of registers disposed within a graphics processing unit (GPU), the method comprising:

identifying within a first log file test results associated with a first register type under a first set of testing conditions;

identifying within a second log file test results associated with the first register type under a second set of testing conditions;

creating a template document associated with the first register type that includes a different spreadsheet for each log file of test results associated with the first register type, wherein the template document is configured to store and operate on the test results associated with the first register type;

for each of the first log file and the second log file, populating a different spreadsheet of the template document with the test results associated with the first register type stored in the log file, wherein each spreadsheet includes an array for the test results, each array for each spreadsheet is structured the same, and each cell within an array indicates a passing result or a failing result for a different combination of a register value for the first register type and a data bit for a bus between the GPU and a local memory coupled to the GPU;

aggregating the test results across each similarly positioned cell within each of the arrays of test results to show how many times each of the different register values for the first register type failed testing; and without human intervention, determining one or more suitable register values to use in operating the GPU from a passing range of register values based on the aggregated test results.

2. The method of claim 1, wherein each spreadsheet in the template document is configured to store the test results based on a plurality of register values for the first register type and a plurality of data bits for a bus facilitating communication between the GPU and a graphics memory subsystem on a graphics adapter that includes the local memory.

3. The method of claim 2, wherein each array of test results is configured with a first number of rows, wherein each row is associated with a different one of the plurality of register values in a sequential order.

4. The method of claim 3, wherein the template document is configured with a second number of columns, wherein each column is associated with a different one of the plurality of data bits.

5. The method of claim 4, further comprising establishing the passing range of register values by identifying, without human intervention and based on a formula pre-configured in the template document, a set of rows from the first number of rows that contains only passing information.

6. The method of claim 5, wherein the determining step further comprises selecting a register value corresponding to the middle of the passing range of register values to be the suitable register value.

7. The method of claim 1, wherein the aggregating step further comprising:
    summing the test results across each similarly positioned cell stored within each of the arrays of test results to generate summed results based on a formula pre-configured in the template document; and
    placing the summed results in an output array having a structure consistent with the structure of the other arrays in the template document.

8. The method of claim 1, wherein the first set of testing conditions involves a version of the GPU, a version of the graphics adapter in which the GPU resides, and a number of registers associated with the first register type.

9. A non-transitory computer-readable medium containing a sequence of programming instructions, which when executed by a processing unit in a computing device, causes the processing unit to:
    identify within a first log file test results associated with a first register type under a first set of testing conditions;
    identify within a second log file test results associated with the first register type under a second set of testing conditions;
    create a template document associated with the first register type that includes a different spreadsheet for each log file of test results associated with the first register type, wherein the template document is configured to store and operate on the test results associated with the first register type;
    for each of the first log file and the second log file, populate a different spreadsheet of the template document with the test results associated with the first register type stored in the log file, wherein each spreadsheet includes an array for the test results, each array for each spreadsheet is structured the same, and each cell within an array indicates a passing result or a failing result for a different combination of a register value for the first register type and a data bit for a bus between the GPU and a local memory coupled to the GPU;
    aggregate the test results across each similarly positioned cell within each of the arrays of test results to show how many times each of the different register values for the first register type failed testing; and
    without human intervention, determine one or more suitable register values to use in operating the GPU from a passing range of register values based on the aggregated test results.

10. The non-transitory computer readable medium of claim 9, wherein each spreadsheet in the template document is configured to store the test results based on a plurality of register values for the first register type and a plurality of data bits for a bus facilitating communication between the GPU and a graphics memory subsystem on a graphics adapter that includes the local memory.

11. The non-transitory computer readable medium of claim 10, wherein each array of test results is configured with a first number of rows, wherein each row is associated with a different one of the plurality of register values in a sequential order.

12. The non-transitory computer readable medium of claim 11, wherein the template document is configured with a second number of columns, wherein each column is associated with a different one of the plurality of data bits.

13. The non-transitory computer readable medium of claim 12, further comprising a sequence of programming instructions, which when executed by the processing unit, causes the processing unit to establish the passing range of register values by identifying, without human intervention and based on a formula pre-configured in the template document, a set of rows from the first number of rows that contains only passing information.

14. The non-transitory computer readable medium of claim 13, further comprising a sequence of programming instructions, which when executed by the processing unit, causes the processing unit to select a register value corresponding to the middle of the passing range of register values to be the suitable register value.

15. The non-transitory computer readable medium of claim 9, further comprising a sequence of programming instructions, which when executed by the processing unit, causes the processing unit to:
    sum the test results across each similarly positioned cell stored within each of the arrays of test results to generate summed results based on a formula pre-configured in the template document; and
    place the summed results in an output array having a structure consistent with the structure of the other arrays in the template.

16. The non-transitory computer readable medium of claim 9, wherein the first set of testing conditions involves a version of the GPU, a version of the graphics adapter in which the GPU resides, and a number of registers associated with the first register type.

17. A computing device configured to automatically analyze graphics processing unit ("GPU") test results, the computing device comprises: a processing unit; and
    a storage medium that includes instructions that, when executed by the processing unit, cause-the processing unit to identify within a first log file test results associated with a first register type under a first set of testing conditions;
    identify within a second log file test results associated with the first register type under a second set of testing conditions;
    create a template document associated with the first register type that includes a different spreadsheet for each log file of test results associated with the first register type, wherein the template document is configured to store and operate on the test results associated with the first register type;

for each of the first log file and the second log file, populate a different spreadsheet of the template document with the test results associated with the first register type stored in the log file, wherein each spreadsheet includes an array for the test results, each array for each spreadsheet is structured the same, and each cell within an array indicates a passing result or a failing result for a different combination of a register value for the first register type and a data bit for a bus between the GPU and a local memory coupled to the GPU;

aggregate the test results across each similarly positioned cell within each of the arrays of test results to show how many times each of the different register values for the first register type failed testing; and without human intervention, determine one or more suitable register values to use in operating the GPU from a passing range of register values based on the aggregated test results.

\* \* \* \* \*